US011062320B2

(12) United States Patent
Trivedi et al.

(10) Patent No.: US 11,062,320 B2
(45) Date of Patent: Jul. 13, 2021

(54) USER ACCOUNT CONTROLS FOR ONLINE TRANSACTIONS

(71) Applicant: Capital One Services, LLC, McLean, VA (US)

(72) Inventors: Dwij Trivedi, Oakton, VA (US); Jeffrey M. Samitt, Glenn Allen, VA (US); Dalton L. M. Lebarbenchon, Midlothian, VA (US); Pavel Fort, Westbury, NY (US); Christopher J Stout, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 126 days.

(21) Appl. No.: 15/803,182

(22) Filed: Nov. 3, 2017

(65) Prior Publication Data

US 2019/0122215 A1    Apr. 25, 2019

Related U.S. Application Data

(60) Provisional application No. 62/574,661, filed on Oct. 19, 2017.

(51) Int. Cl.
*G06Q 20/40* (2012.01)
*G06Q 20/20* (2012.01)
(Continued)

(52) U.S. Cl.
CPC ......... *G06Q 20/405* (2013.01); *G06F 40/174* (2020.01); *G06Q 20/12* (2013.01);
(Continued)

(58) Field of Classification Search
CPC ............. G06Q 20/405; G06Q 20/3221; G06Q 30/0609; G06Q 30/0641
(Continued)

(56) References Cited

U.S. PATENT DOCUMENTS 8,555,355 B2 * 10/2013 Rathbun ............... H04L 9/3213
726/5
8,744,961 B2 * 6/2014 Allen ................. G06Q 20/0425
705/38
(Continued)

OTHER PUBLICATIONS

J. W. Ng and D. H. Lau, "Going Beyond Web Browsing to Web Tasking: Transforming Web Users from Web Operators to Web Supervisors," 2013 IEEE Ninth World Congress on Services, Santa Clara, CA, USA, 2013, pp. 126-130, doi: 10.1109/SERVICES.2013.22. (Year: 2013).*

(Continued)

*Primary Examiner* — Jessica Lemieux
(74) *Attorney, Agent, or Firm* — Harrity & Harrity, LLP

(57) ABSTRACT

A device may receive, from a user device, transaction data, the transaction data including: a user account identifier indicating a user account associated with the user device, and data indicating a particular merchant associated with a transaction. The device may provide the data indicating the particular merchant to a server device and receive, from the server device, a merchant identifier for the particular merchant associated with the transaction. The device may then identify, based on the merchant identifier and the user account identifier, a user account control, the user account control specifying a restriction for transactions associated with the user account and the particular merchant. Based on the transaction data, the device may determine whether the user account control is satisfied and perform an action based on a result of the determination.

20 Claims, 8 Drawing Sheets

(51) Int. Cl.
  *G06Q 20/38* (2012.01)
  *G06Q 20/34* (2012.01)
  *G06Q 20/12* (2012.01)
  *G06Q 20/32* (2012.01)
  *G06F 40/174* (2020.01)
  *G06Q 30/06* (2012.01)

(52) U.S. Cl.
  CPC ....... *G06Q 20/204* (2013.01); *G06Q 20/3221* (2013.01); *G06Q 20/3278* (2013.01); *G06Q 20/351* (2013.01); *G06Q 20/385* (2013.01); *G06Q 30/0609* (2013.01); *G06Q 30/0641* (2013.01)

(58) Field of Classification Search
  USPC ........................................................... 705/4
  See application file for complete search history.

(56) References Cited

U.S. PATENT DOCUMENTS

| | | | |
|---|---|---|---|
| 9,602,949 B2 | 3/2017 | Wetzel et al. | |
| 9,998,978 B2* | 6/2018 | Youdale | H04W 48/02 |
| 10,127,542 B2* | 11/2018 | Syed | G06Q 20/327 |
| 2008/0177758 A1* | 7/2008 | Eldering | G06Q 10/107 |
| 2008/0243702 A1* | 10/2008 | Hart | G06Q 20/3672 |
| | | | 705/66 |
| 2009/0132405 A1* | 5/2009 | Scipioni | G06Q 20/12 |
| | | | 705/35 |
| 2010/0205079 A1 | 8/2010 | Ferguson et al. | |
| 2011/0265172 A1 | 10/2011 | Sharma et al. | |
| 2012/0055983 A1* | 3/2012 | Wellborn | G06Q 20/322 |
| | | | 235/375 |
| 2012/0297451 A1 | 11/2012 | Ozzie | |
| 2013/0054803 A1 | 2/2013 | Shepard et al. | |
| 2013/0060692 A1* | 3/2013 | Typrin | G06Q 40/02 |
| | | | 705/44 |
| 2013/0109348 A1 | 5/2013 | Sharma et al. | |
| 2014/0012704 A1 | 1/2014 | Mizhen et al. | |
| 2014/0259135 A1 | 9/2014 | Postrel | |
| 2014/0289118 A1 | 9/2014 | Kassemi et al. | |
| 2015/0052036 A1 | 2/2015 | Vernal et al. | |
| 2015/0052061 A1 | 2/2015 | Anderson et al. | |
| 2016/0140555 A1 | 5/2016 | Scipioni | |
| 2016/0142873 A1 | 5/2016 | Trivedi et al. | |
| 2017/0180343 A1 | 6/2017 | de Ganon et al. | |
| 2017/0278174 A1 | 9/2017 | Harrell | |

OTHER PUBLICATIONS

Extended European Search Report for Application No. EP18201493.6, dated Mar. 18, 2019, 9 pages.

* cited by examiner

FIG. 6

CHECKOUT Total Purchase: $50.00

BILLING INFORMATION 710

Card Type: Select
Card Number:
Expiration Date:
CVV:
Cardholder Name:
Street Address:
State: Select
Zip Code:

720 — Monthly transaction limit reached for merchant.com. Purchase anyway? [Yes] [No]

http://www.merchant.com

USER ACCOUNT CONTROLS FOR ONLINE TRANSACTIONS

CROSS-REFERENCE TO RELATED APPLICATION

This application claims priority under 35 U.S.C. § 119 to U.S. Provisional Patent Application No. 62/574,661, filed on Oct. 19, 2017, the content of which is incorporated by reference herein in its entirety.

BACKGROUND

People often make use of user devices (e.g., personal computers, mobile phones, tablet computers, or the like) for conducting transactions online, e.g., via the Internet. For example, a user may—using a web browser application operating on a user device—shop for goods and/or services listed on a merchant's web page. To conduct a transaction with the merchant, a user might provide user payment account information (e.g., credit card data or other payment account in to the merchant to pay for goods and services. The user payment account information is often entered into a form displayed by the web browser application of the user device before being submitted to the merchant and/or a payment system.

SUMMARY

According to some implementations, a device may include one or more processors to receive form data from a merchant device, the form data including instructions that cause a web browser application operating on the device to display a merchant form for a transaction associated with a merchant; determine, based on the form data, that the form data is for the transaction; provide, based on determining that the form data is for the transaction, transaction data to a server device, the transaction data including at least a portion of the form data; receive a merchant identifier from the server device, the merchant identifier indicating the merchant associated with the transaction; identify, based on the merchant identifier, merchant specific controls associated with the merchant, the merchant specific controls specifying at least one restriction for transactions associated with the merchant; determine, based on the merchant specific controls, whether the transaction satisfies the at least one restriction; and perform an action based on determining whether the transaction satisfies the at least one restriction.

According to some implementations, a non-transitory computer-readable medium may store instructions, the instructions including one or more instructions that, when executed by one or more processors, cause the one or more processors to: receive, from a user device, merchant payment data specifying payment data for each merchant of a plurality of merchants, the payment data indicating: a user payment account for making payments to the merchant, and at least one merchant specific control that specifies at least one restriction for transactions associated with the merchant, associate the merchant payment data with a user account associated with the user device; receive transaction data from the user device, the transaction data including: a user account identifier indicating the user account, data indicating a particular merchant associated with a transaction, the particular merchant being one of the plurality of merchants, and a transaction value associated with the transaction; identify, based on the transaction data and the merchant payment data, at least one merchant specific control associated with the particular merchant; determine, based on the transaction data, whether the at least one merchant control is satisfied; and perform an action based on the determination of whether the at least one merchant control is satisfied.

According to some implementations, a method may include receiving, by a device and from a user device, transaction data, the transaction data including: a user account identifier indicating a user account associated with the user device, and data indicating a particular merchant associated with a transaction; providing, by the device, the data indicating the particular merchant to a server device; receiving, by the device and from the server device, a merchant identifier for the particular merchant associated with the transaction; identifying, by the device and based on the merchant identifier and the user account identifier, a user account control, the user account control specifying a restriction for transactions associated with the user account and the particular merchant; determining, by the device and based on the transaction data, whether the user account control is satisfied; and performing, by the device, an action based on a result of the determination of whether the user account control is satisfied.

BRIEF DESCRIPTION OF THE DRAWINGS

FIGS. 6-7 are diagrams of example user interfaces associated wide using user account controls for online transactions.

DETAILED DESCRIPTION

Figure 1A:
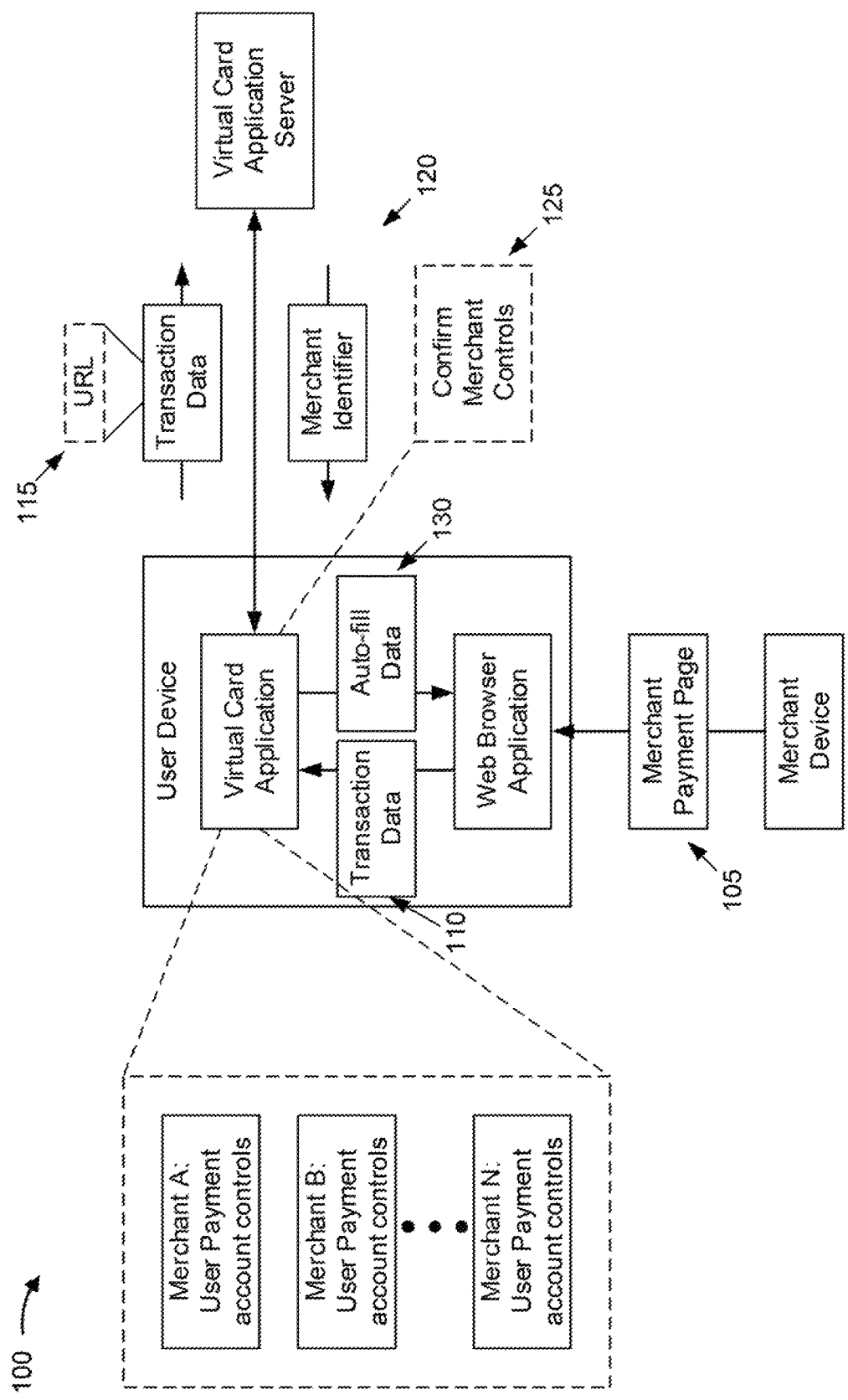
FIG. 1A is a diagram of an overview of an example implementation described herein.

The following detailed description of example implementations refers to the accompanying drawings. The same reference numbers in different drawings may identify the same or similar elements.

For users that shop for gelds and services online, security and control over the manner in which online payments are handled may vary. Depending on the merchant website, it may be difficult to tell which, merchant the user is transacting with and/or whether the transaction is secure. For example, some online merchants use third party payment services to collect payments (e.g., by redirecting a user device's web browser to a separate website to submit payment account information), which may cause contusion on the part of the user, and the third party payment services may lack proper security. In addition, while user devices can store payment account information (e.g., credit, card data, checking account data, or the like) using a web browser application or other application operating on the user device, and user devices can use the stored payment account information to auto-fill forms for making payments online, users often have little or no controls in place for specific merchants, categories of merchants, or user, payment accounts (e.g., controls such as those providing the user with situational awareness regarding, and/or control over, the manner in which user payment accounts are used for specific merchants or categories of merchants).

Some implementations, described here, provide a virtual card application and virtual card application server that are capable of providing a user of a user device with the ability to establish user payment accounts for merchants and set, user account controls regarding transactions with those merchants. The virtual card application (e.g., a web browser extension application or other application operating on the user device) and the virtual card application server may use information associated with a pending transaction to apply security techniques and/or take action using user account controls established by the user. For example, the virtual card application may determine that an online transaction is about to occur (e.g., by analyzing a web page presented in a web browser application of the user device) and cause the user device to send transaction data to the virtual card application server. The virtual card application server can use the transaction data (e.g., data identifying the specific merchant, a user account fear the user of the user device, data indicating a value associated with the transaction, or the like) determine which user account controls may apply to the transaction, such as a transaction value limit for the merchant associated with the transaction, a transaction value limit for the user payment account to be used for the transaction, or the like.

Based on the user account controls, and whether the transaction satisfies restrictions that are based on the user account controls, the virtual card application server can perform a variety of actions, such as notifying the user regarding the user account controls, recommending auto-fill data for the user device to auto-fill a payment form, prompting the user for authorization regarding the transaction, securing the transaction using a secure token representing user payment account information, or the like. Other actions involving the transaction may be taken by the virtual card application server and/or the virtual card application, e.g., in a manner designed to provide the user with security and control over the user's online transactions.

The ability to provide user account controls for online transactions can improve the security and efficiency of conducting online transactions while providing the user with an enhanced user experience. For example, security may be improved by confirming the merchant associated with the transaction, requesting authorization from the user, and/or using a secure token to limit transmissions of user payment account information (e.g., by transmitting a secure token rather than a user account number or the like). The efficiency of online transactions may be improved for the users and user devices involved in the transactions, e.g., by providing the user devices with auto-fill data that can be used to complete online payment forms in a manner designed to reduce mistakes and reduce the time spent by the user devices on web pages and reduce the time merchant devices hold transactions while awaiting user payment account information. Reducing time spent conducting online transactions may reduce computing resource usage of both a user device and a merchant device, e.g., reducing power consumption, processing resources, and data storage resources. In addition, user experience may be enhanced by providing a user with control over how online transactions should be handled in a merchant specific manner, which may be controlled independently from any user payment account controls that a user might have in place. Users may also be provided with additional assurances regarding transaction security, further improving the users' experience with online transactions.

FIG. 1A is a diagram of an overview of an example implementation 100 described herein. As shown in FIG. 1A, example implementation 100 may include a user device, a merchant device, and a virtual card application server. In addition, the user device may include a web browser application and a virtual card application.

As shown in FIG. 1, and by reference number 105, the merchant device provides the web browser application of the user device with data associated with a merchant payment page. For example, a user associated with the user device may use the web browser application to request a web page associated with a merchant (e.g., a provider of goods or services, a payment intermediary, a service, intermediary, or the like) with the intent of conducting a transaction with the merchant associated with the merchant device. For example, the merchant device may be a web server for a restaurant that allows online ordering via the Internet, and the merchant payment page may be a web page provided to the user device with a web form designed to collect user payment account information (e.g., a credit card number or the like).

As further shown in FIG. 1A, and by reference number 110, the virtual card application operating on the user device obtains transaction data from the web browser application. Transaction data may include a variety of information related to a transaction associated with the merchant payment page, e.g., a resource locator for the merchant payment page, web form data for the merchant payment page, and/or transaction details (such as a transaction value). For example, the virtual card application may be a web browser extension application that the user installed on the user device to facilitate online transactions. The virtual card application may obtain the transaction data by reading the data provided by the merchant payment page. For example, by recognizing various web form fields, such as credit card number, name, address, purchase amount, or the like, the virtual card application may determine that the merchant payment page is requesting user payment account information and, based on the determination, may obtain transaction data from the merchant payment page.

As further shown in FIG. 1A, and by reference number 115, the user device provides transaction data to the virtual card application server. For example, the virtual card application operating on the user device may cause the user device to transmit the transaction data to the virtual card application server. The information included in the transaction data may vary and may be the same as or different from the transaction data obtained from the web browser application. In the example implementation 100, the user device provides the virtual card application server with transaction data that includes the universal resource locator (URL) associated with the merchant payment page.

As further shown in FIG. 1A, and by reference number 120, the user device receives, a merchant identifier from the virtual card application server. For example, the virtual card application operating on the user device may receive a merchant identifier that specifies the merchant associated with the merchant payment, page, e.g., using the restaurant web page example above, the merchant identifier may be an identifier that is designed to uniquely identify the particular restaurant associate with the web page.

As further shown in FIG. 1A, and by reference number 125, the user device confirms merchant controls related to the identified merchant. For example, the virtual card application may include or otherwise have access to merchant payment data (also referred to as "virtual cards") associated with the user of the user device. Merchant payment data may include, for various merchant identifiers, merchant controls, user payment account information, and/or other information that may be used by the virtual card application to facilitate the handling of online transactions with merchants associated with the merchant identifiers.

By way of example, to confirm merchant controls for the example situation involving a transaction with the website of a particular restaurant, the user of the user device may have previously established one or more merchant controls for the particular restaurant. Each merchant control may specify a restriction, such as a restriction limiting the amount a user can spend at that restaurant to no more than $100.00 per month, a restriction limiting the number of times a payment may be made to the restaurant to no more than three per month, a restriction limiting the hours or days of week that a payment may be made to the restaurant, or the like. The merchant payment data may include (or the user device may otherwise have access to) data indicating how much the user has spent at the particular restaurant in the past month, enabling the virtual card application to determine whether that particular merchant control is satisfied with respect to the pending transaction. For example, in a situation where the user has previously spent $90.00 at the restaurant in the past month, a transaction value exceeding $10 would exceed the restriction set by the example merchant control, while a transaction value less than $10 would not exceed the restriction, satisfying the example merchant control. Many other types of controls may be used, including controls associated with user payment accounts, merchant categories, or the like.

As further shown in FIG. 1A, and by reference number 130, the virtual card application provides auto-fill data to the web browser application. The auto-fill data may include, for example, data designed to fill out the web form provided by the merchant payment page, facilitating the transaction with the merchant by confirming merchant controls associated with the merchant and by also providing auto-fill data to assist the user in completing the transaction. While the virtual card application provides auto-fill data in the example implementation 100, the virtual card application may perform a variety of actions based n whether the transaction satisfies the merchant controls.

By way of example, the virtual card application may cause the user device to display a user prompt enabling the user of the user device to determine whether to auto-fill the web form, select from multiple user payment accounts associated with the merchant (e.g., user payment accounts included in the virtual card, or merchant payment data, for the merchant). In a situation where the merchant control is not satisfied (e.g., a transaction value would cause a restriction on a monthly transaction limit to be reached), the virtual card application may cause the user device to display a user prompt enabling the user of the user device to determine whether the restriction should be followed, ignored, or updated. In some implementations, based on determining that the transaction is to proceed (e.g., applicable controls are satisfied and/or overridden by the user), the virtual card application may provide a secure token for inclusion in the auto-fill data. By providing a secure token (e.g., rather than user payment account information such as a credit card number), the virtual card application may limit transmission of sensitive information while also providing the merchant with data that will enable the transaction to be completed. In this way, the virtual card application and virtual card application server described in example implementation 100 may provide additional control and security to a user conducting transactions online.

Figure 1B:
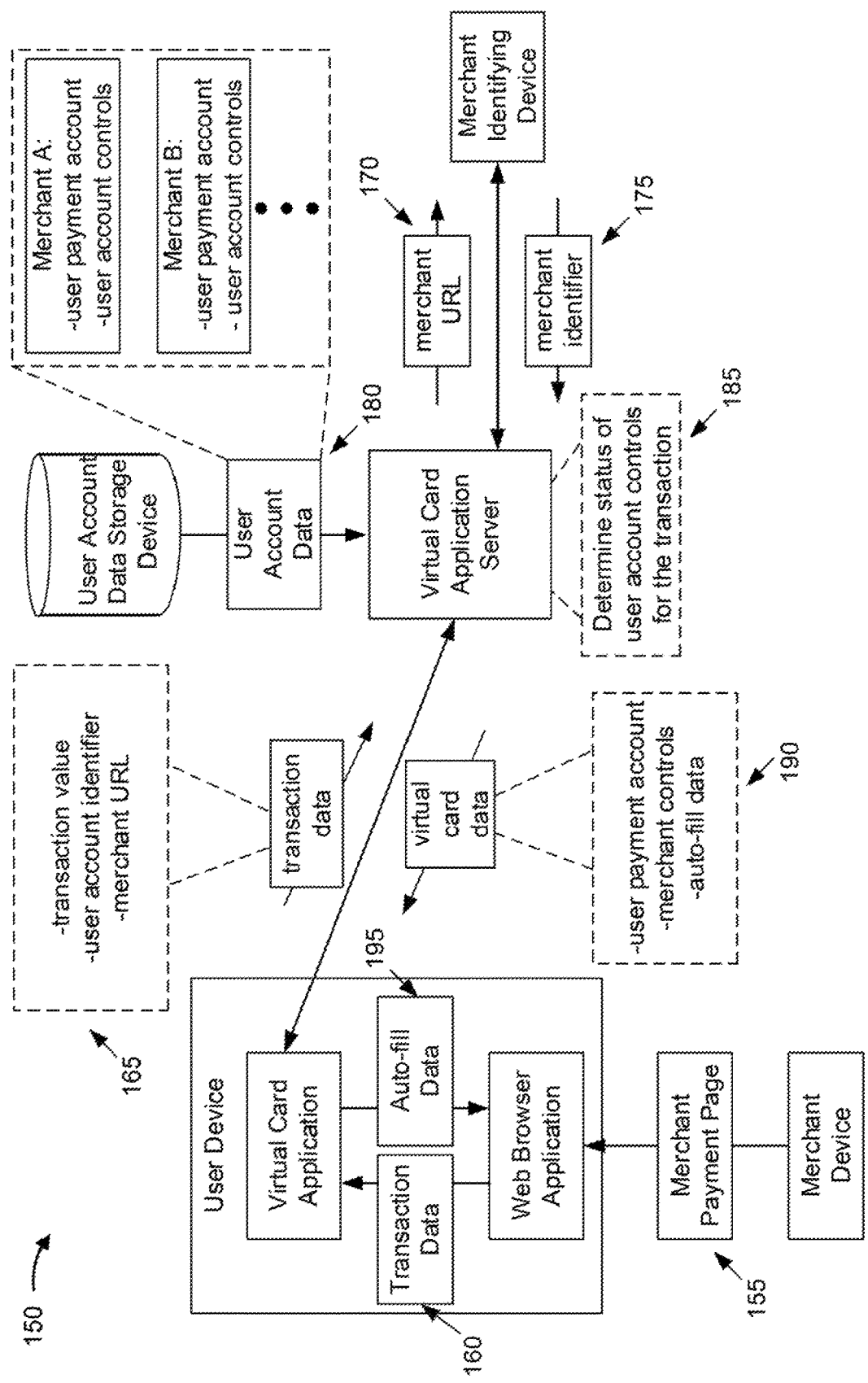
FIG. 1B is a diagram of an overview of another example implementation described herein.

FIG. 1B is a diagram of an overview, of another example implementation 150 described herein. As shown in FIG. 1B, example implementation 150 may include a user device, a merchant device, a virtual cud application server, a user account data storage device, and a merchant identifying device. In addition, the user device may include a web browser application and a virtual card application.

As shown in FIG. 1B, and by reference number 155, the merchant device provides the web browser application of the user device with data associated with a merchant payment page. This may occur in a manner similar to that described above with respect to reference number 105 of FIG. 1A. For example, a user associated with the user device may use the web browser application to request a web page associated with a merchant with the intent of conducting a transaction with the merchant associated with the merchant device.

As further shown in FIG. 1B, and by reference number 160, the virtual card application operating on the user device obtains transaction data from the web browser application. This may occur in a manner similar to that described above with respect to reference number 110 of FIG. 1A. For example, the virtual card application may be a web browser extension application that the user installed on the user device to facilitate online transactions. The virtual card application may obtain the transaction data by reading the data provided by the merchant payment page.

As further shown in FIG. 1B, and by reference number 165, the user device provides transaction data to the virtual card application server. For example, the virtual card application operating on the user device may cause the user device to transmit the transaction data to the virtual card application server. The information included in the transaction data may vary and may be the same as or different from the transaction data obtained from the web browser application. In the example implementation 150, the user device provides the virtual card application server with transaction data that includes a transaction value (e.g., a monetary value associated with the transaction), a user account identifier (e.g., identifying a user account associated with the user device), and the URL associated with the merchant payment page.

As further shown in FIG. 1B, and by reference number 170, the virtual card application server provides the merchant URL to a merchant identifying device. The merchant identifying device may be any device capable of providing a merchant identifier based on input data, such as input data indicating a associated with a merchant website.

As further shown in FIG. 1B, and by reference number 175, the virtual card application server receives a merchant identifier from the merchant identifying device. The merchant identifier may, for example, uniquely identify the merchant associated with the merchant URL, which is also the merchant associated with the transaction.

As further shown in FIG. 1B, and by reference number 180, the virtual card application server obtains user account data from a user account data storage device. The user account data may be obtained, for example, using the user account identifier included in the transaction data. The user account data includes a variety of virtual cards (e.g., merchant payment data) for multiple different merchants. As noted above, each virtual card may store, for a particular merchant, a user payment account and/or one or more user account controls associated with the particular merchant. The user account controls may be specific to a merchant (e.g., merchant specific controls), controls for categories of merchants (e.g., merchant category controls), or controls associated with a user payment account e.g., user payment account controls). In the example implementation 150, the virtual card application server may obtain user account data based on the merchant identifier, in a manner designed to identify all user account controls that may place a restriction on transactions with the merchant associated with the merchant identifier.

As further shown in FIG. 1B, and by reference number 185, the virtual card application server determines the status of the user account controls for the transaction. By way of example, the virtual card application server may identify, in the user account data, a virtual card associated with the merchant associated with the merchant payment page. The virtual card may include a merchant specific control specifying a maximum transaction value for transactions associated, with the merchant. Whether the transaction satisfies the merchant specific control may depend on the value of the transaction, which was provided in the transaction data. In a situation where the transaction value does not exceed the maximum transaction value, the merchant specific control may be satisfied, and in a situation where the transaction value does exceed the maximum transaction value, the merchant specific control may not be satisfied. In some implementations, the virtual card application server may determine the status of multiple user account controls (e.g., one or more merchant specific controls, one or more merchant category controls, and/or one or more user payment account controls).

As further shown in FIG. 1B, and by reference number 190, the virtual card application server provides virtual card data to the user device. The virtual card data may include a variety of information capable of being used by the virtual card application to facilitate completion of the transaction and/or to perform other actions. The virtual card data may be provided to the virtual card application in a manner designed to enable the virtual card application to facilitate completion of the transaction, or to perform another action. In the example implementation 150, the virtual card data includes data identifying a user payment account, user account controls (e.g., and/or the status of the user account controls), and auto-fill data (e.g., information stored in the user account data that can be used to fill in the fields of a web-based payment form, such as name, address, phone number, or the like).

As further shown in FIG. 1B, and by reference number 195, the virtual card application provides auto-fill data to the web browser application. This may occur in a manner similar to that described above with respect to reference number 130 of FIG. 1A. For example, the auto-fill data may include data designed to fill out the web form provided by the merchant payment page, facilitating the transaction with the merchant by providing auto-fill data to assist the user in completing the transaction. While the virtual card application provides auto-fill data in the example implementation 150, the virtual card application may perform a variety of actions based on whether the transaction satisfies the user account controls, including notifying and/or prompting the user of user device for input, which is described in further detail below.

As indicated above, FIGS. 1A and 1B are provided merely as examples. Other examples are possible and may differ from what was described with regard to FIG. 1A or 1B. In some implementations, the virtual card application server may be capable of receiving and processing transaction data from many user devices at many different times. In this situation, virtual card application server may receive transaction data associated with hundreds, thousands, millions, billions, or more transactions, enabling virtual card application server to manage user account controls for hundreds, thousands, millions, billions, or more transactions—data sets that cannot be processed, at least not processed objectively, by a human operator.

Figure 2:
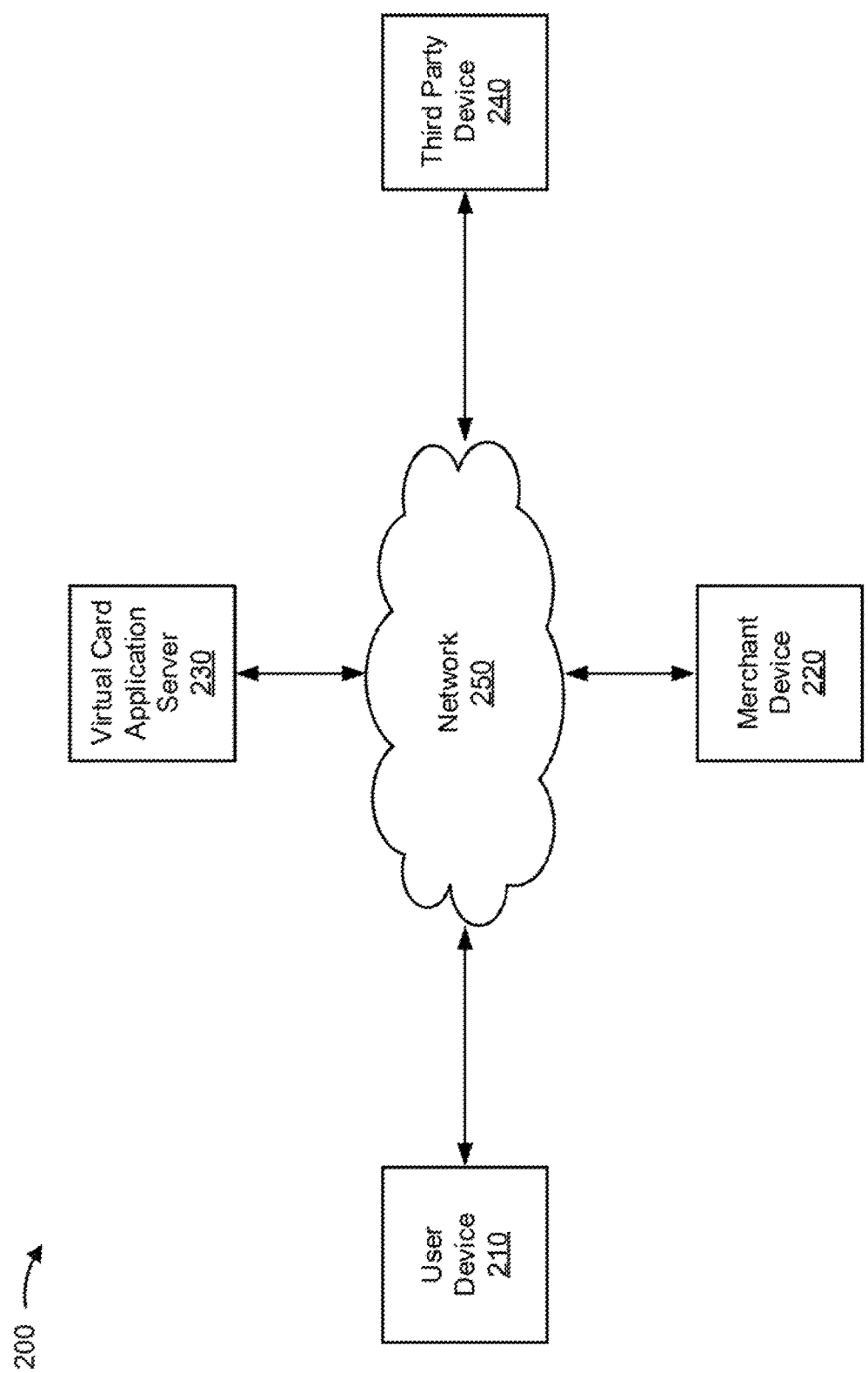
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a merchant device 220, a virtual card application server 230, a third party device 240, and network 250. Devices of environment 200 may interconnect via wired connections, wireless connections, or a combination of wired and wireless connections.

User device 210 includes one or more devices capable of receiving, generating, storing, processing, and/or providing information associated with online transactions and/or user account controls. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart, eyeglasses, etc.), or a similar type of device. User device 210 may include one or more applications to facilitate online transactions, such as a web browser application, a virtual card application (e.g., a web browser extension application), or the like.

Merchant device 220 includes one or more devices capable of receiving, generating, storing, processing, and/or providing information associated with online transactions. For example, merchant device 220 may include a computing device, such as a server computer, personal computer, mobile phone, laptop computer, tablet computer, or a similar type of device. Merchant device 220 may be owned, operated, and/or otherwise associated with a merchant, such as a provider of goods or services, a payment intermediary, a service intermediary, or the like. For example, merchant device 220 may be a merchant web server that provides a website enabling a user of user device 210 to conduct an online transaction using, the website.

Virtual card application server 230 includes one or inure devices capable of receiving, generating, storing, processing, and/or providing information associated with online transactions and user account controls. For example, virtual card application server 230 may include a communication and/or computing device, such as a server computer, personal computer, mobile phone, laptop computer, tablet computer, or a similar type of device. Virtual card application server 230 may be capable of communicating with one or more applications operating on a user device 210, such as a virtual card application, to facilitate online transactions between user device 210 and merchant device 220. In some implementations, virtual card application server 230 may be implemented by a group of server devices of a cloud computing environment or a data center. For example, some or all of the functions of virtual card application server 230 may be performed by one or more virtual machines implemented on one or more server devices in a cloud computing environment or a data center. Virtual card application serer 230 may, in some implementations, have access to local and/or remote storage of user account data for a user of user device 210 (e.g., user account data that may include user account controls).

Third party device 240 includes one or more devices capable of receiving, generating, storing, processing, and/or providing information associated with online transactions and user account controls. For example, third party device 240 may include a computing device, such as a server computer, personal computer, mobile phone, laptop computer, tablet computer, or a similar type of device. Third party device 240 may be capable of performing a variety of actions to facilitate an online transaction between user device 210 and merchant device 220. For example, third party device 240 may be a merchant identifying device that is capable of providing unique merchant identifiers for association with user account controls. As another example, third party device 240 may be a financial service provider that is capable of processing payments for a user payment account associated with user device 210.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
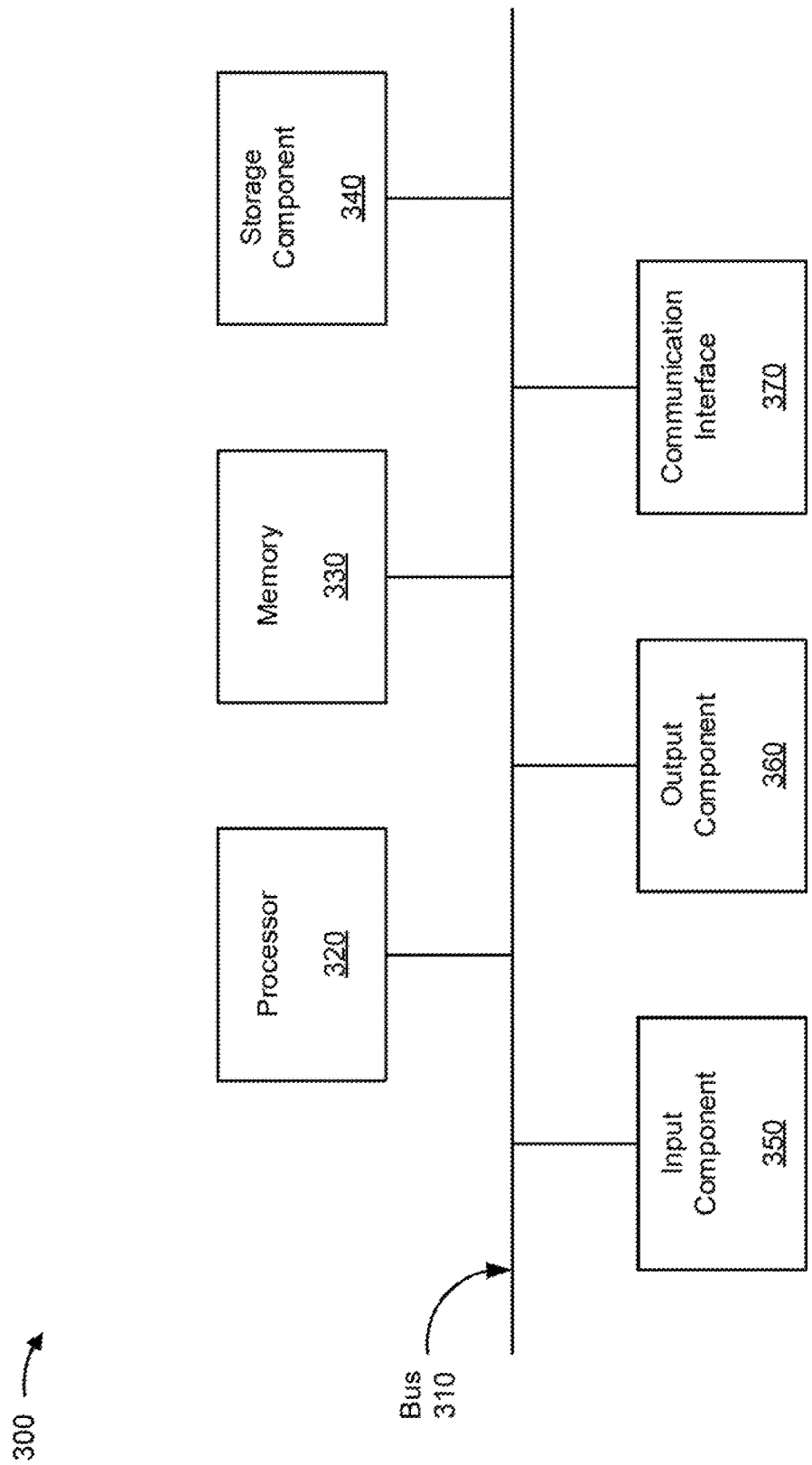
FIG. 3 is a diagram of example components of one or more devices of FIG. 2.

FIG. 3 is a diagram of example components of a device 300. Device 300 may correspond to user device 210, merchant device 220, virtual card application server 230, and/or third party device 240. In some implementations, user device 210, merchant device 220, virtual card application server 230, and/or third party device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use, by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
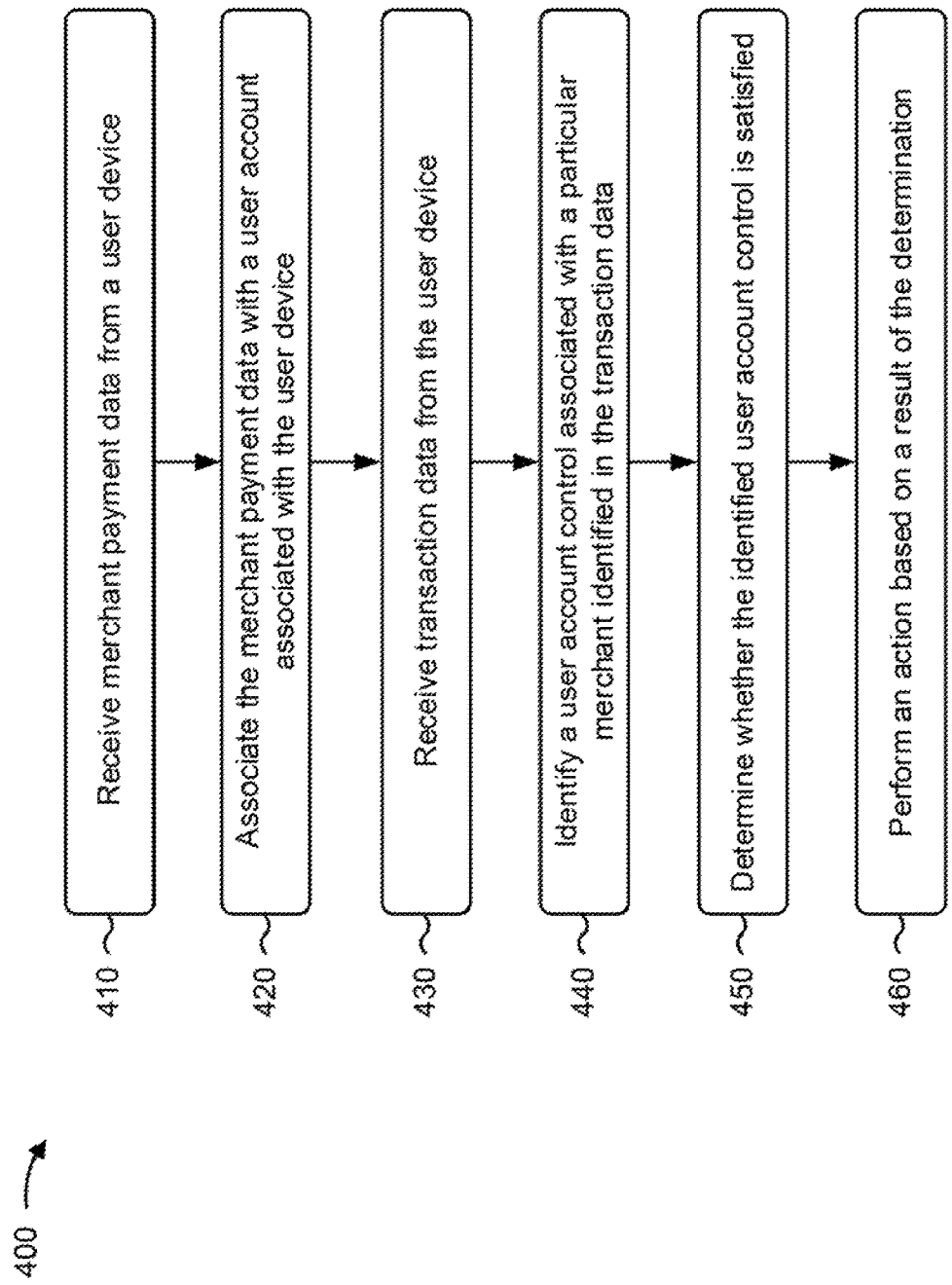
FIG. 4 is a flow chart of an example process for using user account controls for online transactions.

FIG. 4 is a flow chart of an example process 400 for using user account controls for online transactions. In some implementations, one or more process blocks of FIG. 4 may be performed by virtual card application server 230. In some implementations, one or more process blocks of FIG. 4 may be performed by another device or a group of devices separate from or including virtual card application server 230, such as user device 210, merchant device 220, and/or third party device 240.

As shown in FIG. 4, process 400 may include receiving merchant payment data from a user device (block 410). For example, virtual card application server 230 may receive merchant payment data from user device 210. Merchant payment data, which is also referred to as virtual card data, may include a variety of information enabling virtual card application server 230 to facilitate online transactions with user device 210. The merchant payment data may include, for example, user payment account information (e.g., including one or more user payment account identifiers), one or more user account controls (e.g., including merchant specific controls, merchant category controls, user payment account controls, or the like), and one or more merchant identifiers (e.g., data uniquely identifying a provider of goods and/or services, a service intermediary, and/or a payment intermediary).

In some implementations, merchant payment data may specify user payment account information and user account controls associated with individual merchant identifiers. By way of example, a particular merchant identifier may be associated with a particular user payment account and a particular user account control. This association, among the particular merchant identifier, the particular user payment account, and the particular user account control, may be stored in what is sometimes referred to as a virtual card, e.g., a data structure that includes the merchant payment data to enable virtual card application server 230 to facilitate online transactions associated with the merchant associated with the particular merchant identifier. While the foregoing example virtual card included a single user payment account and a single user account control for the particular merchant identifier, in some implementations, multiple user payment accounts and/or multiple user account controls may be associated with any given merchant identifier. In some implementations, user payment accounts may be included in multiple virtual cards (e.g., the same credit card account may be associated with multiple different merchant identifiers).

In some implementations, merchant payment data may include user account controls that are associated with merchant categories (e.g., merchant category controls). A merchant category control specifies a restriction on transactions associated with a particular category or categories of merchant, e.g., instead of or in addition to a restriction specific to a particular merchant. By way of example, a merchant category control may specify that purchases associated with merchants in the "restaurant" category not exceed a cumulative transaction value over a predefined period of time. Merchant categories can be identified in a variety of ways, including manual categories assigned by a user of user device 210 and/or merchant categories provided by a merchant categorization device, such as third party device 240. In some implementations, merchant category controls may be associated with one or more user payment accounts, e.g., in a manner designed to apply the merchant category controls to only transactions being paid for using the associated user payment accounts.

In some implementations, merchant payment data may include user account controls that are associated with user payment accounts (e.g., user payment account controls). A user payment account control specifies a restriction on transactions associated with a particular user payment account (e.g., transactions using a particular credit card account, debit card account, payment intermediary account, or the like). By way of example, a user payment account control may specify a maximum transaction value associated with any given transaction. In some implementations, user payment account controls may be associated with one or more merchant category controls, e.g., in a manner designed to apply the user payment account controls to only transactions with merchants in the associated merchant categories.

While some example user account controls are provided above, a variety of user account controls may be provided in merchant payment data. For example, user account controls may specify a restriction on a total value of all transactions, a restriction on an individual transaction value for a single transaction, a restriction on a cumulative transaction value over a period of time, a restriction on a transaction frequency, and/or a restriction on a user device 210 to be used in a transaction. The foregoing restrictions may be included in user payment account controls, merchant category controls, and/or merchant specific controls.

Virtual card application server 230 may receive the merchant payment data in a variety of different ways. In some implementations, user device 210 may access a merchant payment data control panel that enables the user of user device 210 to configure merchant payment data (e.g., by providing user payment account information, user account controls, and merchant identifiers). For example, the merchant payment data control panel may be provided by a virtual card application operating on user device 210. As another example, the merchant payment data control panel may be provided in a web pave by a web server, such as virtual card application server 230 or third party device 240.

In some implementations, virtual card application server 230 may receive merchant payment data in association with a particular transaction. For example, the first time a user of user device 210 conducts a transaction using a particular user payment account and/or with a particular merchant, virtual card application server 230 may obtain merchant payment data. In this situation, virtual card application server 230, or virtual card application operating on user device 210, may solicit user input regarding the transaction (e.g., in a manner designed to obtain permission for storing user payment account information and obtain user account controls). In some implementations, virtual card application server 230 may receive merchant payment data from a separate user device 210 associated with a user, e.g., a user may have multiple user devices 210, and merchant payment data may be provided by any of the user devices 210 associated with the user.

In this way, virtual card application server 230 may receive merchant payment data from user device 210, enabling virtual card application server 230 to associate the merchant payment data with a user account associated with user device 210, e.g., in a manner designed to provide the user of user device 210 with security and control in performing online transactions.

As further shown in FIG. 4, process 400 may include associating the merchant payment data with a user account associated with the user device (block 420). For example, virtual card application server 230 may associate the merchant payment data with a user account associated with user device 210. Virtual card application server 230 may identify the user account associated with user device 210 in a variety of ways. For example, user device 210 may include data identifying the user account in the merchant payment data provided to virtual card application server 230. As another example, a virtual card application operating on user device 210 may be associated with the user account and cause user device 210 to separately provide data identifying the user account to the virtual card application server 230.

The merchant payment data may be associated with the user account in a variety of ways. For example, virtual card application server 230 may store an association between the user account and the merchant payment data in a user account data storage device, such as a database. Storing an association may include, in some implementations, storing the merchant payment data itself, e.g., in a database and associated with a user account identifier. The example user account data storage device may be local to virtual card application server 230, remote, or a combination thereof. Associating the merchant payment data with the user account enables virtual card application server 230 to access the merchant payment data using data identifying the user account.

In this way, virtual card application server 230 may associate the merchant payment data with a user account associated with user device 210, enabling virtual card application server 230 to access the merchant payment data using data identifying the user account.

As further shown in FIG. 4, process 400 may include receiving transaction data from the user device (block 430). For example, virtual card application server 230 may receive transaction data from user device 210. In some implementations, a virtual card application operating on user device 210 causes user device 210 to send the transaction data (e.g., the virtual card application may be a browser extension application that detects when a transaction is about to occur through a web browser application of user device 210, obtains transaction data associated with the transaction, and causes user device 210 to send the transaction data to virtual card application server 230).

The transaction data may include a variety of information regarding a transaction. For example, the transaction data may include a user account identifier associated with user device, data identifying a particular merchant associated with the transaction (e.g., a merchant name, merchant URL, or the like), and/or transaction details (e.g., transaction value, transaction date, a good and/or service involved in the transaction, or the like). In some implementations, the transaction data may include data identifying user device (e.g., data specifying a hardware address or hardware identifier associated with user device 210), enabling virtual card application server 230 to uniquely identify user device 210.

In some implementations, virtual card application server 230 may receive transaction data from a device other than user device 210. For example, virtual card application server 230 may receive transaction data from third party device 240, such as a point-of-sale device associated with a merchant. In this example, the point-of-sale device may obtain the user account identifier from user device 210 (e.g., virtual card application operating on user device 210 may provide the point-of-sale device with the user account identifier using near-field communications (NFC)). As another example, the point-of-sale device may obtain user payment account data (e.g., from a credit card being, swiped or inserted at the point-of-sale device), and the user payment account data may be provided to virtual card application server 230. In this situation, virtual card application server 230 may use the user payment account data to identify the user account identifier associated with the user payment account (e.g., by querying a user account data storage device that stores associations between user payment accounts and user identifiers).

In some implementations, the data identifying the particular merchant associated with the transaction (e.g., the merchant name, merchant URL, or the like) may not correspond to one of the unique merchant identifiers used by virtual card application server 230 to determine user account controls that may be associated with the corresponding merchant. In this situation, virtual card application server 230 may obtain the unique merchant identifier using third party device 240. For example, third party device 240 may be a merchant identifying device capable of receiving data identifying a particular merchant (such as a merchant URL or the like) and providing the unique merchant identifier that corresponds to the particular merchant. Obtaining the unique merchant identifier for the particular merchant associated with the transaction enables virtual card application server 230 to identify user account controls that may be associated with the particular merchant (e.g., in the merchant payment data previously provided by user device 210).

In this way, virtual card application server 230 may receive transaction data associated with a transaction, enabling virtual card application server 230 to determine whether one or more user account controls apply to the transaction.

As further shown in FIG. 4, process 400 may include identifying a user account control associated with a particular merchant identified in the transaction data (block 440). For example, virtual card application server 230 may identify a user account control associated with the particular merchant identified in the transaction data. In some implementations, the virtual card application server 230 may use the user account identifier included in the transaction data to access merchant payment data associated with the user account identifier (e.g., the merchant payment data received in block 410). As noted above, the merchant payment data associated with the user account identifier may include multiple virtual cards that specify, for a given merchant, application user payment account(s) and/or user account controls. The merchant payment data may also specify, in some implementations, merchant category controls and/or user payment account controls that may be applicable to the particular merchant associated with the transaction.

In some implementations, virtual card application server 230 may identify a user account control included in a virtual card that is associated with the particular merchant. For example, using a unique merchant identifier for the merchant identified in the transaction data, virtual card application server 230 may identify, in merchant payment data associated with user device 210, a virtual card associated with the particular merchant. The virtual card may specify, for example, a user payment account (e.g., a credit card number or the like) and a merchant specific control specifying a restriction, such as a single transaction limit for transactions associated with the particular merchant. In some implementations, multiple virtual cards may be capable of being used for the transaction, and virtual card application server 230 may determine which virtual card to use (and which user account controls will be identified for the transaction) in a variety of ways. For example, virtual card application server 230 may identify a virtual card with the most lenient user account controls (e.g., higher transaction limit); a virtual card with the most restrictive user account controls (e.g., lower transaction limit); a randomly selected virtual card; a virtual card most recently used in a prior online transaction; a virtual card associated with the user payment account with the most recent account statement date; or a virtual card associated with a preference of the user of user device 210 (e.g., previously assigned a priority and/or determined by prompting the user).

In some implementations, virtual card application server 230 may identify a merchant category control associated with the particular merchant. For example, the merchant payment data associated with user device 210 may include a merchant category control that specifies a restriction for transactions involving merchants that are associated with a particular merchant category, such as a cumulative monthly transaction value limit. The merchant category (or categories) of the particular merchant associated with the transaction may be determined in a variety of ways. For example, the merchant payment data may specify which merchants belong to which merchant categories (e.g., each virtual card, which is associated with a unique merchant identifier, may also include a merchant category to which the corresponding merchant belongs). As another example, merchant category may be obtained from third party device 240, e.g., the same merchant identifying device that provides the unique merchant identifier for the particular merchant may also provide the merchant category (or categories) for the particular merchant.

In some implementations, virtual card application server 230 may identify a user payment account control associated with the particular merchant. For example, the merchant payment data associated with user device 210 may include a user payment account control that specifies a restriction for transactions paid for using the user payment account, such a restriction that specifies the user payment account may only be used for transactions conducted using a particular device, such as user device 210. Virtual card application server 230 may determine which device is associated with a particular transaction, for example, using data that may be included in the transaction data (e.g., data specifying a hardware address or hardware identifier associated with user device 210).

Virtual card application server 230 may identify any number and/or type of user account controls that are applicable to the transaction as, in some implementations, more than one user account control may be applicable for the transaction. In this way, virtual card application server 230 may identify a user account control associated with the particular merchant identified in the transaction data, enabling virtual card application server 230 to determine whether the user account control is satisfied.

As further shown in FIG. 4, process 400 may include determining whether the identified user account control is satisfied (block 450). For example, virtual card application server 230 may determine whether the identified user account control is satisfied. Virtual card application server 230 may determine whether the identified user account control is satisfied using information included in the transaction data. For example, the transaction value and/or data identifying user device 210 may be used to determine whether the identified user account control is satisfied. As indicated above, restrictions specified by user account controls may vary, and virtual card application server 230 may determine whether the identified user account control is satisfied may also vary.

For example, for a user account control specifying a restriction on a total value of all transactions associated with a user payment account, merchant category, and/or specific merchant, virtual card application server 230 may use the transaction value included in the transaction data to determine whether the user account control is satisfied. For example, virtual card application server 230 may store or otherwise have access to a total value of all transactions associated with a user payment account. In a situation where virtual card application server 230 determines that the restriction on total value is not exceeded by adding the transaction value to the total value, virtual card application server 230 may determine that the user account control is satisfied. In a situation where virtual card application server 230 determines that the restriction on total value is exceeded by adding the transaction value to the total value, virtual card application server 230 may determine that the user account control is not satisfied.

As another example, for a user account control specifying a restriction on an individual transaction value for a single transaction associated with a user payment account, merchant category, and/or specific merchant, virtual card application server 230 may use the transaction value included in the transaction data to determine whether the user account control is satisfied. For example, virtual card application server 230 compare the transaction value included in the transaction data to the restriction on the individual transaction value. In a situation where virtual card application server 230 determines that the restriction on the individual transaction value is not exceeded the transaction value, virtual card application server 230 may determine that the user account control is satisfied. In a situation where virtual card application server 230 determines that the restriction on the individual transaction value is exceeded the transaction value, virtual card application server 230 may determine that the user account control is not satisfied.

In addition, for an example user account control specifying a restriction on a cumulative transaction value over a period of time for transactions associated with a user payment account, merchant category, and/or specific merchant, virtual card application server 230 may use the transaction value included in the transaction data to determine whether the user account control is satisfied. The determination may be made in a manner similar to that for determining whether a restriction on total value is exceeded, but limited to transactions occurring over a predetermined period of time (e.g., the past 30 days, the current calendar month, or the like).

As another example, for a user account control specifying a restriction on a transaction frequency for transactions associated with a user payment account, merchant category, and/or specific merchant, virtual card application server 230 may use receipt of the transaction data to determine whether the user account control is satisfied. For example, virtual card application server 230 may store or otherwise have access to a total number of transactions associated with a user payment account and timestamps associated with the transactions. In this situation, virtual card application server 230 may use frequency specified by the user account control (e.g., no more than 7 transactions in any 7 day period, no more than 10 transactions in a calendar month, or the like) and the data identifying the total number of transactions and timestamps to determine whether the user account control is satisfied.

For an example user account control specifying a restriction on a user device for use in transactions associated with a user payment account, merchant category, and/or specific merchant, virtual card application server 230 may use data identifying user device 210, which is included in the transaction data, to determine whether the user account control is satisfied. In a situation where the data identifying user device 210 included in the transaction data matches the user device specified by the user account control, virtual card application server 230 may determine that the user account control is satisfied. In a situation where the data identifying user device 210 included in the transaction data does not match the user device specified by the user account control, virtual card application server 230 may determine that the user account control is not satisfied.

In some implementations, multiple user account controls may be applicable to a given transaction. In this situation, virtual card application server 230 may determine, for each of the user account controls, whether the user account control is satisfied. In some implementations, virtual card application server 230 may determine whether the user account controls are satisfied in a variety of ways. For example, satisfaction, or non-satisfaction, of user account controls applicable to the given transaction may be based on determining that all user account controls are satisfied; a majority of user account controls are satisfied; and/or a weighted combination of user account controls exceeds a threshold satisfaction weight (e.g., each user account control may be associated with a weight, and the weights associated with the user account controls may be compared to a threshold to determine whether the user account controls are satisfied).

In this way, virtual card application server 230 may determine whether the identified user account control is satisfied, enabling virtual card application server 230 to take a variety of actions based on the determination.

As further shown in FIG. 4, process 400 may include performing an action based on a result of the determination (block 460). For example, virtual card application server 230 may perform an action based on whether the identified user account control is satisfied. The actions taken by virtual card application server 230 may vary, and in some implementations, virtual card application server 230 may perform multiple actions.

In some implementations, virtual card application server 230 may provide user device 210 with virtual card data, or response data, which may include a variety of information to facilitate the online transaction with the particular merchant. For example, the virtual card data may include data identifying the user payment account(s) (e.g., credit card account number, debit card account number, payment intermediary login data, or the like) associated with the particular merchant. The virtual card application server 230 may also provide user device 210 with data identifying the application user account controls and information regarding whether the user account controls are satisfied. Additionally, or alternatively, the virtual card application server 230 may provide user device 210 with virtual card data that includes auto-fill data (e.g., data designed to be used to fill in fields of a merchant payment page, such as user name, address, phone number, or the like).

By providing user device 210 with virtual card data such as the data described above, virtual card application server 230 enables user device to use the virtual card data to facilitate performing the transaction with the particular merchant. In some implementations, virtual card application server 230 may provide user device 210 with the virtual card data in a manner designed for the virtual card data to be used by a virtual card application operating on user device 210. For example, the virtual card data may enable the virtual card application to perform a variety of actions, including prompting a user of user device 210 to select a user payment account to use for the transaction, notifying the user of user device 210 regarding the satisfaction (and/or non-satisfaction) of user account controls that may be applicable to the transaction, prompting the user of user device 210 to enable the virtual card application to auto-fill data in a web form of a merchant payment page, or the like. Actions that may be performed by the virtual card application are described in further detail below, e.g., with respect to FIG. 5.

In some implementations, virtual card application server 230 may provide user device 210 with a secure token for use in completing the transaction with the particular merchant. The secure token may include data representing a user payment account, such as a pseudo-random string of characters. For example, virtual card application server 230, and/or third party device 240, may store a mapping of user payment account data (e.g., credit card numbers or the like) to secure tokens (e.g., pseudo-random strings or the like). By providing user device 210 with a secure token, rather than actual user payment account data, virtual card application server 230 may provide an additional layer of security for the transaction with the particular merchant. In situations where a secure token is used, the merchant device may resolve the token by communicating with third party device 240, and/or leave secure token resolution to a financial service provider device (e.g., such as a payment processor with access to data mapping secure tokens to user payment account data). In this way, the actual payment information used for the transaction is secure from tampering by a malicious party or a party associated with virtual card application server 230.

In some implementations, virtual card application server 230 may provide authorization data to an authorization device associated with user device 210, such as another user device 210 associated with the user of both user devices 210. For example, user account data associated with the user of user device 210 may specify a second user device 210 to which authorization data may be sent. Authorization data may cause the second user device 210 to prompt the user to provide user input authorizing the transaction. By way of example, a user may have a laptop computer and a mobile phone, associated with the user, identified in the user's account data. When conducting a transaction using the laptop computer, virtual card application server 230 may send authorization data to the user's mobile phone to seek authorization for the transaction, which may make the transaction even more secure. In some implementations, the authorization data can include a variety of information regarding the user account controls associated with the transaction, such as the data provided in the virtual card data described above. In some implementations, the authorization data may be handled at user device 210 by the virtual card application.

Virtual card application server 230 may perform some or all of the example actions provided above, and/or other actions, based on the determination regarding whether user account controls associated with the transaction are satisfied. In some implementations, virtual card application server 230 may determine which action(s) to perform based on satisfaction, or lack of satisfaction, of particular user account controls. For example, failure to satisfy one user account control may result in virtual card application server 230 providing auto-fill data in the virtual card data provided to user device 210, while failure to satisfy a different user account control may result in virtual card application server 230 sending data that causes user device 210 to prompt the user for confirmation before auto-fill data is sent. The actions taken, or not taken, may be predetermined (e.g., based on user input provided with merchant payment data in block 410, and/or based on default actions configured for virtual card application server 230).

In this way, virtual card application server 230 may perform an action based on a result of the determination of whether the identified user account control is satisfied. The actions performed may be designed to facilitate user control and security for the corresponding transaction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
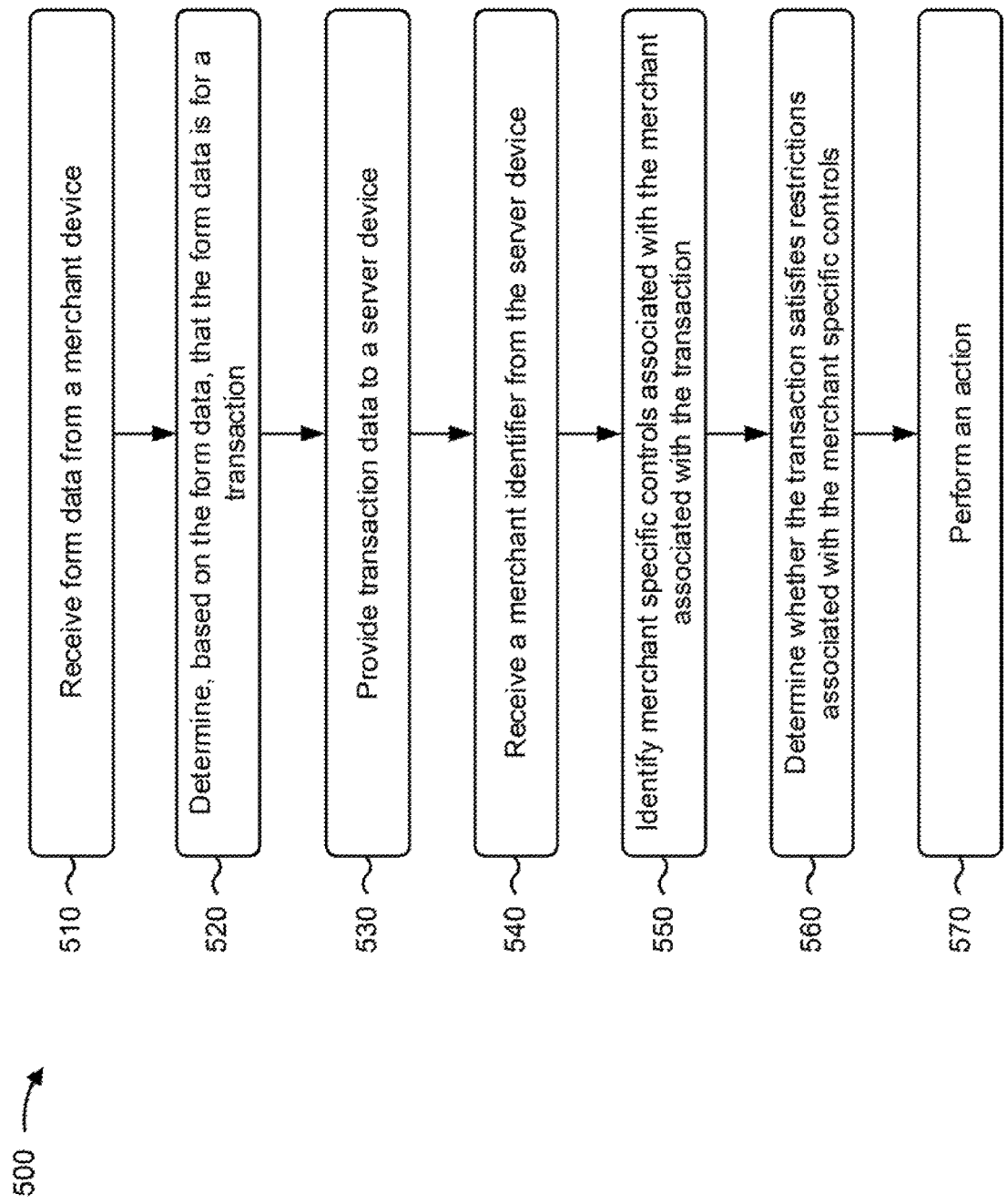
FIG. 5 is a flow chart of another example process for using merchant specific controls for online transactions.

FIG. 5 is a flow chart of another example process 500 for using user account controls for online transactions. In some implementations, one or more process blocks of FIG. 5 may be performed by user device 210. In some implementations, one or more process blocks of FIG. 5 may be performed by another device or a group of devices separate from or including user device 210, such as merchant device 220, virtual card application server 230, and/or third party device 240.

As shown in FIG. 5, process 500 may include receiving form data from a merchant device (block 510). For example, user device 210 may obtain form data from a merchant device 220. In some implementations, the merchant device 220 may be a web server owned and/or operated by a merchant, and the form data may include data presented in a merchant payment page (e.g., a web page presenting a merchant form for a user of user device 210 to fill out to pay for a good or service being provided by the merchant). In some implementations, the form data may be obtained by a virtual card application operating on user device 210, such as a browser extension application that is installed on a web browser application operating on user device 210. The virtual card application may be capable of reading web page data presented by the web browser (e.g., using code inspection techniques to view code underlying a web page, optical character recognition techniques, or the like). The information included in the form data may vary, and may include, by way of example, a merchant URL, a merchant name, a transaction value, a product and/or service associated with the transaction, and field data for entry of various pieces of user information (e.g., user name, address, phone number, payment account number, or the like).

In this way, user device 210 may obtain form data from a merchant device, enabling user device 210 to use the form data to provide the user of user device 210 with control and/or security regarding a potential transaction.

As shown in FIG. 5, process 500 may chide determining, based on the form data, that the form data is or a transaction (block 520). For example, user device 210 may determine that the form data is for a transaction based on the information included in the form data. In some implementations, certain merchant URLs may be associated with transactions. For example, user device 210 may include or otherwise have access to data specifying, for multiple merchants, merchant URLs that indicate the corresponding web page and form data that is associated with a transaction with the corresponding merchant. In some implementations, text included in the form data may indicate, to user device 210, that the form data is for a transaction. For example, certain words or phrases, such as "transaction amount," "payment type," "credit card number," "tax," "total cost," or the like, and/or the inclusion of a monetary value in the form data (e.g., "$50.00"), and/or combinations thereof, might provide user device 210 with an indication that the form data is for a transaction. In some implementations, user device 210 may provide form data to a separate application and/or device to determine whether the form data is for a transaction.

In this way, user device 210 may determine, based on the form data, that the form data is for a transaction, enabling user device 210 to perform actions based on the existence of a pending transaction.

As shown in FIG. 5, process 500 may include providing transaction data to a server device (block 530). For example, user device 210 may provide transaction data to virtual card application server 230 and/or third party device 240. The transaction data may include at least a portion of the information included in the form data, and may be provided in a manner designed to enable the application server 230 and/or third party device 240 to identify a unique merchant identifier associated with the transaction. In some implementations, providing transaction data to a server device to obtain the unique merchant identifier may be performed in a manner similar to the manner in which virtual card application server 230 obtains the unique merchant identifier, e.g., as described above with respect to block 430 of FIG. 4. For example, a virtual card application operating on user device 210 may cause user device 210 to provide the merchant URL included in the form data to a merchant identifying device that is capable of identifying the unique merchant identifier of the merchant associated with the merchant URL.

In this way, user device 210 may provide transaction data to a server device, enabling user device 210 to receive a unique merchant identifier.

As shown in FIG. 5, process 500 may include receiving a merchant identifier from the server device (block 540). For example, user device 210 may receive, from virtual card application server 230 or third party device 240, the unique merchant identifier that indicates the merchant associated with the transaction. In this way, user device 210 may receive the unique merchant identifier, enabling user device 210 to identify merchant specific controls (and/or other controls) associated with the unique merchant identifier.

As shown in FIG. 5, process 500 may include identifying merchant specific controls associated with the merchant associated with the transaction (block 550). For example, user device 210 may identify merchant specific controls (and/or other controls, such as user payment account controls, merchant category controls, or the like). In some implementations, identifying merchant specific controls may be performed in a manner similar to the manner in which virtual card application server 230 identifies user account controls, e.g., as described above with respect to block 440 of FIG. 4. For example, the virtual card application operating on user device 210 may include or otherwise have access to merchant payment data associated with a user account of the user of user device 210, and the merchant payment data may include information specifying one or more user account controls that may be associated with the merchant identified by the unique merchant identifier (e.g., the merchant associated with the transaction). The user account controls may include user payment account controls, merchant category controls, and/or merchant specific controls, each with one or more corresponding restrictions on transactions to which the user account control applies.

In this way, user device 210 may identify merchant specific controls associated with the merchant associated with the transaction, enabling user device 210 to determine whether the transaction satisfies the restrictions associated with the merchant specific controls.

As shown in FIG. 5, process 500 may include determining whether the transaction satisfies restrictions associated with the merchant specific controls (block 560). For example, user device 210 may determine whether the transaction satisfies restrictions associated with the merchant specific controls. In some implementations, determining whether the transaction satisfies restrictions associated with the merchant specific controls may be performed in a manner similar to the manner in which virtual card application server 230 determines whether the identified user account control is satisfied, e.g., as described above with respect to block 450 of FIG. 4. For example, the virtual card application operating on user device 210 may identify a merchant specific restriction, such as a maximum transaction limit for a single transaction with the particular merchant associated with the transaction. Using a transaction value included in the form data, user device 210 may determine whether the merchant specific restriction is satisfied by comparing the transaction value included in the form data to the maximum transaction limit specified by the merchant specific restriction. In a situation where the transaction value does not exceed the maximum transaction limit, user device 210 may determine that the merchant specific restriction is satisfied. In a situation where the transaction value does exceed the maximum transaction limit, user device 210 may determine that the merchant specific restriction is not satisfied. While the foregoing example is described in terms of merchant specific controls, the description also applies to other types of user account controls, such as merchant category controls and user payment account controls.

In this way, user device 210 may determine whether the transaction satisfies the merchant specific restrictions associated with the merchant specific controls, enabling user device 210 to take action based on the determination.

As shown in FIG. 5, process 500 may include performing an action based on a result of the determination of whether the transaction satisfies the restrictions associated with the merchant specific controls (block 570). For example, user device 210 may perform an action based on a result of the determination of whether the transaction satisfies the restrictions associated with the merchant specific controls. In some implementations, the action(s) performed by user device 210 may be similar to the action(s) capable of being performed by virtual card application server 230, e.g., as described above with respect to block 460 of FIG. 4.

For example, the virtual card application operating on user device 210 may cause user device to display, or provide the web browser application of user device 210 with data that causes display of, virtual card data. The virtual card data may include a variety of information, such as data identifying one or more user payment accounts associated with the particular merchant associated with the transaction, one of more user account controls associated with the particular merchant, and/or auto-fill data for filling in the web form provided by the merchant device 220. In some implementations, a virtual card application operating on user device 210 may provide a secure token for use in a user payment account field of the web form provided by the merchant device 220. For example, the virtual card application may have previously stored (e.g., in merchant payment data) or obtained (e.g., from virtual card application server 230 or third party device 240) a secure token for a user payment account associated with the particular merchant associated with the transaction.

In some implementations, the virtual card application operating on user device 210 may cause user device 210 to display a variety of information, including user prompts, related to the virtual card data. For example, the virtual card application may cause user device 210 to display one or more a user prompts to facilitate the completion (or cancellation) of the transaction. By way of example, a user prompt may include a request for a user to select from multiple available user payment accounts to complete the transaction (e.g., in a situation where multiple user payment accounts are included in the merchant payment data associated with the merchant). A user prompt may include a request to auto-fill one or more web forms related to the transaction (e.g., including auto-filling user payment account data and other user information, such as user name, address, phone number, or the like). A user prompt may include a notification regarding the status of one or more user account controls applicable to the transaction (e.g., a user prompt may indicate that the transaction satisfies an existing merchant specific control that restricts the individual transaction value associated with transactions with the particular merchant associated with the transaction). A user prompt may include a request for a user to override, or ignore, a non-satisfied user account control (e.g., providing the user of user device 210 the ability to ignore the non-satisfied user account control). A user prompt may display information regarding a user account control and, regardless of satisfaction of the control, include a request for confirmation of the transaction. As another example, a user prompt may include a request to change a user account control (e.g., enabling the user of user device 210 to change or remove a restriction associated with a user account control). As noted above, user device 210 may display a variety of information related to virtual card data, which may include, some, none, or all of the foregoing examples.

In this way, user device 210 may perform an action based on a result of the determination of whether the transaction satisfies the restrictions associated with the merchant specific controls, providing the user of user device 210 with additional security and control for online transactions.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6-7 are diagrams of example user interfaces 600 and 700 associated with using user account controls for online transactions. The example user interfaces 600 and 700 may be provided, for example, by user device 210 using a web browser application and/or virtual card application operating on user device 210.

As shown in FIG. 6, example user interface 600 includes a merchant payment form. The merchant payment form may be displayed, for example, on user device 210 in a situation where a user of user device is shopping for goods and/or services online (e.g., using a web browser application of user device 210). The example user interface includes form data 610, which may be used to determine that the interface 600 is for a transaction, and to obtain transaction data that can be used to identify user account controls associated with a merchant that is associated with the transaction. For example, form data 610 may include some or all of the text presented in the example user interface 600.

As shown in FIG. 7, example user interface 700 includes the merchant payment form, including the form data 710 and a prompt 720 displaying virtual card data. The prompt 720 may be displayed, for example, on user device 210 in a situation where user device 210 has identified a merchant specific control associated with the particular merchant associated with the transaction (e.g., in the example interface, the particular merchant is displayed as "merchant.com"). The example prompt 720 includes data indicating that the transaction does not satisfy a merchant specific control and offers the user of user device 210 the option to proceed with the transaction, e.g., as indicated by the language, "Monthly transaction limit reached for merchant.com. Purchase anyway?"

As indicated above, FIGS. 6 and 7 are provided merely as examples. Other examples are possible and may differ from what was described with regard to FIG. 6 or 7.

As noted above, the ability to provide user account controls and/or additional security measures for online transactions can improve the security and efficiency of conducting online transactions while providing the user with an enhanced user experience. For example, security may be improved by confirming the merchant associated with the transaction, requesting authorization from the user, and/or using a secure token to limit transmissions of user payment account information (e.g., by transmitting a secure token rather than a user account number or the like). The efficiency of online transactions may be improved for the users and devices involved in the transactions, e.g., by providing the user device with auto-fill data that can be used to complete online payment forms in a manner designed to reduce mistakes and reduce the time spent by a user device on a web page and reduce the time a merchant device holds a transaction while awaiting user payment account information. Reducing time spent conducting online transactions may reduce computing resource usage of both the user device and merchant device, e.g., reducing power consumption, processing resources, and data storage resources. In addition, user experience may be enhanced by providing a user with control over how online transactions should be handled in a manner specific to particular merchants and/or categories of merchant, which may be controlled independently from any user payment account controls that a user might have in place. Users may also be provided with additional assurances regarding transaction security, further improving the users' experience with online transactions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although, each dependent claim listed below may directly depend on only one claim, the disclosure of possible implementations includes each dependent claim in combination with every other claim in the claim set.

No element act, or instruction used herein should be construed as critical or essential unless explicitly described as such. As used herein, the term "or the like" is intended to be inclusive (e.g., as in "and/or the like"), unless explicitly stated otherwise. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
  receive, by a virtual card application operating on the device, form data from a merchant device,
    the form data including instructions that cause a web browser application operating on the device to display a merchant form for a transaction associated with a merchant;
  determine, based on the form data, that the form data is for the transaction;
  transmit, by the virtual card application and based on determining that the form data is for the transaction, transaction data to a virtual card application server device,
    the transaction data including at least a portion of the form data, and
    the transaction data including a universal resource location (URL) associated with the merchant;
  receive a merchant identifier from the virtual card application server device,
    the merchant identifier indicating the merchant associated with the transaction, and
    the merchant identifier being determined based on the URL;
  identify, by the virtual card application and based on the merchant identifier, merchant specific controls associated with the merchant,
    the merchant specific controls specifying at least one restriction for transactions associated with the merchant, and
    the merchant specific controls being set by a user of the device;
  determine, by the virtual card application and based on the merchant specific controls, whether the transaction satisfies the at least one restriction;
  generate a user interface for displaying the merchant form for the transaction;
  perform, by the virtual card application, an action based on determining whether the transaction satisfies the at least one restriction,
    the action including at least one of:
      causing the device to display, via the user interface, data indicating whether the transaction satisfies the at least one restriction, or
      causing the device to display data, via the user interface, indicating that the transaction failed to satisfy the at least one restriction;
  receive, from the virtual application card server device, authorization data to authorize the transaction,
    the authorization data being provided by the virtual card application server device to another device associated with the user to cause the other device to authorize the transaction;
  obtain form auto-fill data associated with the merchant;
  receive, from the virtual card application server device, a secure token, the secure token including a pseudo-random string of
characters representing a user payment account,
and
a mapping of user payment account data to respective secure tokens being stored in the virtual card application server device;
provide, by the virtual card application, the secure token to be included in the form auto-fill data;
provide, by the virtual card application, the form auto-fill data to the web browser application to fill in the merchant form provided, for display, on the web browser application,
the form auto-fill data including the secure token; and
transmit the secure token to the merchant device to complete the transaction so that the user payment account data is not exposed to tampering.

2. The device of claim 1, where the merchant specific controls specify at least one of:
a restriction on a total value of all transactions;
a restriction on an individual transaction value for a single transaction;
a restriction on a cumulative transaction value over a period of time;
a restriction on a transaction frequency for transactions; or
a restriction on a user device for use in transactions.

3. The device of claim 1, where the one or more processors are further to:
receive user input prior to receiving the form data,
the user input specifying, for the merchant, the merchant specific controls associated with that merchant.

4. The device of claim 1, where the one or more processors are further to:
cause the device to display a user prompt enabling a user of the device to override a particular merchant specific control associated with the at least one restriction that the transaction failed to satisfy.

5. The device of claim 1, where the one or more processors are to:
identify, based on the merchant identifier, merchant category controls associated with the merchant,
the merchant category controls specifying an additional restriction for transactions associated with merchants in a particular category; and
determine, based on the merchant category controls, whether the transaction satisfies the additional restriction,
the device to display data indicating whether the transaction satisfies the additional restriction.

6. The device of claim 5, where the additional restriction is associated with a cumulative transaction value threshold over a predetermined period of time.

7. The device of claim 1, where the one or more processors, when performing the action, are to:
generate one or more prompts to facilitate completion or cancellation of the transaction.

8. A non-transitory computer-readable medium storing instructions, the instructions comprising:
one or more instructions that, when executed by one or more processors of a device, cause the one or more processors to:
receive, by a virtual card application operating on the device, form data from a merchant device,
the form data including instructions that cause a web browser application operating on the device to display a merchant form for a transaction associated with a merchant;
determine, based on the form data, that the form data is for the transaction;
transmit, by the virtual card application and based on determining that the form data is for the transaction, transaction data to a virtual card application server device,
the transaction data including at least a portion of the form data, and
the transaction data including a universal resource location (URL) associated with the merchant;
receive a merchant identifier from the virtual card application server device,
the merchant identifier indicating the merchant associated with the transaction, and
the merchant identifier being determined based on the URL;
identify, by the virtual card application and based on the merchant identifier, merchant specific controls associated with the merchant,
the merchant specific controls specifying at least one restriction for transactions associated with the merchant, and
the merchant specific controls being set by a user of the device;
determine, by the virtual card application and based on the merchant specific controls, whether the transaction satisfies the at least one restriction;
generate a user interface for displaying the merchant form for the transaction;
perform, by the virtual card application, an action based on determining whether the transaction satisfies the at least one restriction,
the action including at least one of:
causing the device to display, via the user interface, data indicating whether the transaction satisfies the at least one restriction, or
causing the device to display, via the user interface, data indicating that the transaction failed to satisfy the at least one restriction;
receive, from the virtual application card server device, authorization data to authorize the transaction,
the authorization data being provided by the virtual card application server device to another device associated with the user to cause the other device to authorize the transaction;
obtain form auto-fill data associated with the merchant;
receive, from the virtual card application server device, a secure token,
the secure token including a pseudo-random string of characters representing a user payment account, and
a mapping of user payment account data to respective secure tokens being stored in the virtual card application server device;
provide, by the virtual card application, the secure token to be included in the form auto-fill data;
provide, by the virtual card application, the form auto-fill data to the web browser application to fill in the merchant form provided, for display, on the web browser application,
the form auto-fill data including the secure token; and transmit the secure token to the merchant device to complete the transaction so that the user payment account data is not exposed to tampering.

9. The non-transitory computer-readable medium of claim 8, where the merchant specific controls specify at least one of:
a restriction on a total value of all transactions;
a restriction on an individual transaction value for a single transaction;
a restriction on a cumulative transaction value over a period of time;
a restriction on a transaction frequency for transactions; or
a restriction on a user device for use in transactions.

10. The non-transitory computer-readable medium of claim 8, where the one or more instructions, when executed by the one or more processors, further cause the one or more processors to:
receive user input prior to receiving the form data,
the user input specifying, for the merchant, the merchant specific controls associated with that merchant.

11. The non-transitory computer-readable medium of claim 8, where the one or more instructions, when executed by the one or more processors, further cause the one or more processors to:
cause the device to display a user prompt enabling a user of the device to override a particular merchant specific control associated with the at least one restriction that the transaction failed to satisfy.

12. The non-transitory computer-readable medium of claim 8, where the one or more instructions, when executed by the one or more processors, further cause the one or more processors to:
identify, based on the merchant identifier, merchant category controls associated with the merchant,
the merchant category controls specifying an additional restriction for transactions associated with merchants in a particular category; and
determine, based on the merchant category controls, whether the transaction satisfies the additional restriction,
the device to display data indicating whether the transaction satisfies the additional restriction.

13. The non-transitory computer-readable medium of claim 12, where the additional restriction is associated with a cumulative transaction value threshold over a predetermined period of time.

14. The non-transitory computer-readable medium of claim 8, where the one or more instructions, that cause the one or more processors to perform the action, cause the one or more processors to:
generate one or more prompts to facilitate completion or cancellation of the transaction.

15. A method, comprising:
receiving, by a virtual card application operating on a device and from a merchant device, form data,
the form data including instructions that cause a web browser application operating on the device to display a merchant form for a transaction associated with a merchant;
determining, by the device, and based on the form data, that the form data is for the transaction;
transmitting, by the virtual card application operating on the device and based on determining that the form data is for the transaction, transaction data to a virtual card application server device,
the transaction data including at least a portion of the form data, and
the transaction data including a universal resource location (URL) associated with the merchant;
receiving, by the device, a merchant identifier from the virtual card application server device,
the merchant identifier indicating the merchant associated with the transaction, and
the merchant identifier being determined based on the URL;
identifying, by the virtual card application operating on the device and based on the merchant identifier, merchant specific controls associated with the merchant,
the merchant specific controls specifying at least one restriction for transactions associated with the merchant, and
the merchant specific controls being set by a user of the device;
determining, by the virtual card application operating on the device and based on the merchant specific controls, whether the transaction satisfies the at least one restriction;
generating, by the device, a user interface for displaying the merchant form for the transaction;
performing, by the virtual card application operating on the device, an action based on determining whether the transaction satisfies the at least one restriction,
the action including at least one of:
causing the device to display, via the user interface, data indicating whether the transaction satisfies the at least one restriction, or
causing the device to display, via the user interface, data indicating that the transaction failed to satisfy the at least one restriction;
receiving, by the device and from the virtual application card server device, authorization data to authorize the transaction,
the authorization data being provided by the virtual card application server device to another device associated with the user to cause the other device to authorize the transaction;
obtaining, by the device, form auto-fill data associated with the merchant;
receiving, by the device and from the virtual card application server device, a secure token,
the secure token including a pseudo-random string of characters representing a user payment account, and
a mapping of user payment account data to respective secure tokens being stored in the virtual card application server device;
providing, by the virtual card application operating on the device, the secure token to be included in the form auto-fill data;
providing, by the virtual card application operating on the device, the form auto-fill data to the web browser application to fill in the merchant form provided, for display, on the web browser application,
the form auto-fill data including the secure token; and
transmitting, by the device, the secure token to the merchant device to complete the transaction so that the user payment account data is not exposed to tampering.

16. The method of claim 15, where the merchant specific controls specify at least one of:
a restriction on a total value of all transactions;
a restriction on an individual transaction value for a single transaction;
a restriction on a cumulative transaction value over a period of time;
a restriction on a transaction frequency for transactions; or
a restriction on a user device for use in transactions.

17. The method of claim 15, where performing the action comprises:
  causing the device to display data indicating that the transaction failed to satisfy the at least one restriction.

18. The method of claim 15, further comprising:
  identifying, based on the merchant identifier, merchant category controls associated with the merchant,
    the merchant category controls specifying an additional restriction for transactions associated with merchants in a particular category; and
  determining, based on the merchant category controls, whether the transaction satisfies the additional restriction,
    the device to display data indicating whether the transaction satisfies the additional restriction.

19. The method of claim 18, where the additional restriction is associated with a cumulative transaction value threshold over a predetermined period of time.

20. The method of claim 15, where performing the action comprises:
  generating one or more prompts to facilitate completion or cancellation of the transaction.

\* \* \* \* \*